Patented Aug. 21, 1934

1,970,921

UNITED STATES PATENT OFFICE 1,970,921

TILE COMPOSITION

Andreas Schneider, New York, N. Y., assignor of one-third to Anni Miller, Jersey City, N. J.

No Drawing. Application June 4, 1932,
Serial No. 615,474

4 Claims. (Cl. 106—2)

My invention relates to a new composition of matter to be used for the manufacture by a cold process of lustrous, glazed surface cement wall tile and other cement articles in colors and has for its object to render the process of manufacture more expeditious and considerably cheaper. It avoids the necessity of baking the tile, or subjecting it to high temperatures during the process of manufacture. The tile and other cement articles produced by this new process have a highly glazed finish, require no polishing, are waterproof and completely non-porous on the glazed side. The high lustrous glaze is exceedingly durable, can readily be cleaned with soap and water, and is not affected by weather conditions, nor is it affected or injured by the application of oils or ordinary liquids. The colors are uniform and will not fade or become indistinct. As no heat is used in the process of manufacture, the products are uniform in size and shape and are not subject to warping. My composition consists of the following ingredients combined in the proportions stated.

| | |
|---|---|
| White cement containing 2% calcium stearate | 10 pounds—base |
| Quartz or marble dust | 2 pounds—hardening agent |
| Indin | 2 pounds—non-porous adhesive agent |
| Earth dye | $\frac{1}{16}$ to $\frac{2}{16}$ ounces—coloring agent |
| Solvent | 3 gallons |
| Casein powder | 21 ounces |
| Casein glue | 21 ounces |

Indin, also known under the trade name "Antipor", is a chemical compound, the formula thereof being $C_{16}H_{10}O_2N_2$. It is described on page 486 of the 1931 edition and on page 401 of the 1929 edition of A. W. Mayer's "Chemisches Fachwörterbuch", both published by Otto Spamer, Leipzig, Germany, and on page 177 of William Gardner's "Chemical Synonyms and Tradenames."

The process of manufacture of glazed tile in colors is divided into two operations, the first providing the glazed surface, the second providing the body of the tile. The compounds are poured into forms or molds and remain in the molds for several days to dry and harden. Upon removal from the molds the product is complete.

The ingredients are compounded as follows:

The white cement, quartz, indin and earth dye are thoroughly mixed in a suitable mortar.

In a separate container 21 ounces of powdered casein are dissolved in the solvent consisting of 3 gallons of cold distilled water containing 10% by volume of 15% sal ammoniac solution.

In another vessel 21 ounces of casein glue are mixed with a small quantity of water, making a paste which is then thinned by gradually adding distilled water to make six gallons.

The casein glue and casein water solutions are then thoroughly mixed and left to draw for one hour. The resulting solution is then added to the dry mixture of cement, quartz, indin and earth dye, the mixture being stirred constantly while gradually adding the solution, until a thin flowing mass of the consistency of enamel is obtained. This mixture produces the glazed surface of the tile. The quantity of earth dye used depends on the intensity and shade of colors desired.

The body of the tile has the following composition:

| | |
|---|---|
| Marble dust or fine grained quartz | 60 pounds |
| Quicksetting white Portland cement | 40 pounds |
| Casein powder | 7 ounces |
| Solvent | 7 gallons |

The cement and quartz or marble dust are thoroughly mixed while dry and the casein solution is then gradually added while stirring the mixture.

The glaze mixture is poured into molds of the proper size and shape to a depth of one (1) or two (2) millimeters. The molds are then filled with the body mixture, which is poured on top of the glaze mixture and left undisturbed for 24 hours, after which the molds are arranged back to back in rows, and for a period of from 6 to 10 days sprinkled three times daily with a 1% to 2% sal ammoniac solution.

Thereafter the tiles are taken from the molds, and for a period of 4 weeks placed on shelves for further drying and curing in a maintained temperature of from 17 to 25 degrees centigrade, after which time they are ready for use.

In the manufacture of tile resembling marble, and similar surfaces, where blending of several colors and/or shades is required, the method is slightly different. Drops of various dyes are sprinkled, or by other means placed, on the molds as required, and the glaze mixture is thereupon poured into the mold. The colors and/or shades instantly start to run and blend with each other and are finally absorbed into and become an integral part of the glazed surface the body mixture being added in the same manner as when plain color tiles are being manufactured.

I claim:

1. The herein-described composition of matter consisting of white cement, calcium stearate, indin, quartz or marble dust, earthdye, casein, and casein glue.

2. The herein-described composition of matter for manufacturing durable glazed tile and other cement articles by use of a cold process consisting of white cement, calcium stearate, indin, quartz or marble dust, earthdye, casein and casein glue.

3. The herein-described composition of matter for manufacturing durable glazed tile in colors by use of a cold process, consisting of white cement, calcium stearate, indin, quartz or marble dust, earthdye, casein and casein glue.

4. The herein-described composition of matter consisting of white cement, calcium stearate, indin, quartz or marble dust, earthdye, casein and casein glue and solvent for the purpose of manufacturing wall tile, flowerboxes, ornamental plaques, desk sets and other cement articles by use of a cold process.

ANDREAS SCHNEIDER.